United States Patent Office 3,453,933
Patented July 8, 1969

3,453,933
APPARATUS AND METHOD FOR TEMPLATE CUTTING
Daniel W. Kornhauser, Beachwold, Ohio, assignor, by mesne assignments, to P&F Industries, Inc., Great Neck, N.Y., a corporation of New York
Filed Mar. 16, 1966, Ser. No. 534,740
Int. Cl. B23c 1/16
U.S. Cl. 90—13.1   5 Claims

ABSTRACT OF THE DISCLOSURE

The disclosure relates to a pantograph to make a first template from a line drawing as a pattern. The stylus on the line drawing and the milling cutter for the template are related in diameter to the ratio of the pantograph. A second template generally complementary to the first template within a given uniform dimension therebetween is next fashioned from the first template using the pantograph and using a stylus and milling cutter related in diameters to the uniform dimension.

---

The invention relates in general to template cutting including the apparatus for performing this cutting and the method of using such apparatus.

In many metal working operations a template is desirable so that tracer controlled apparatus may control a machine tool for quick and easy copying or reproduction of complicated shapes. One example is in roll forming equipment wherein a pair of generally complementary rolls are used to roll sheet metal or other material into any one of a number of complicated cross sectional shapes. Such sheet metal is used for tubing, metal trim, eaves troughs, corrugated roofing and the like. In many roll forming machines, for example, ten to thirty roll stands are required so that the sheet metal is gradually changed from a flat sheet to one having the desired contour. Accordingly six or eight pairs of rolls, for example, are required for each roll forming machine with each pair of rolls generally complementary. The rolls are stated to be generally complementary because they are not exactly complementary, differing by the thickness of the sheet metal being operated on. For example, if the pair of rolls were brought into direct engagement it would be seen that they were not exactly complementary. If they are spaced apart by .050" for example and are designed to roll form material of .050" thickness then it may be stated that the rolls are complementary with this given uniform dimension therebetween. To produce the rolls which roll form the strip of sheet metal is usually the job for a skilled machinist.

Usually roll drawings from which the contour forming rolls are made are very complicated drawings with many centers and many different radii. One of the pair of rolls generally has a groove of some shape and the other roll has a ridge. If one is referring to the grooved roll it is usual to make five main reference points on the drawing of the cross sectional contour of such groove. These could be a central point at the bottom of the groove, two points at the opposite sides at the top of the groove, plus two more intermediate points. The skilled machinist in the past has used these five reference points and the many dimensions on the rolls to control by hand an engine lathe or toolroom lathe to make the roll according to the drawing. It was a usual custom to first cut these five points into the workpiece being turned on the lathe. These five points would be gradually cut deeper and deeper and be constantly checked with a micrometer to obtain the correct dimensions for these five points. After this the skilled machinist would cut the remaining contour between the points just by eye to obtain a smooth curve. This was a long laborious process and it took generally two to four hours to complete just one roll.

Next the generally complementary roll had to be made taking into consideration the gauge or thickness of the metal with which the pair of rolls would be used. Another two to four hours was required to complete this second generally complementary roll. Next the rolls had to be checked together to locate the high spots between the pair of rolls and then gradually cut away or ground away to make a smooth pair of rolls which were generally complementary and which would positively grip and form the metal as the metal passed between such pair of rolls.

An object of the present invention is to greatly simplify the above process and to provide apparatus and method to make considerably more accurate pairs of rolls.

Another object of the invention is to provide an apparatus and method for using an accurate drawing of the desired contour to form a template.

Another object of the invention is to provide a method and apparatus for using an enlarged drawing of the desired contour to form a reduced size of template.

Another object of the invention is to provide a method of using a pantograph in the simplified preparation of completed templates.

Another object of the invention is to provide a method and apparatus for making a template which is more accurate in dimensional tolerance than the drawing from which it is made.

Another object of the invention is to provide a template cutting method and apparatus for quickly and easily making a second template generally complementary to a first template.

Another object of the invention is to provide a method and apparatus for cutting a template generally complementary to a first template even though the milling cutter used to cut the second template has a diameter larger than the thickness of the metal with which the finished forming rolls will be used, the templates being used to control the cutting of the forming rolls.

The invention may be incorporated in a template cutting apparatus to cut from a template blank a template corresponding to pattern means comprising, in combination, a pantograph having a stylus, a rotatable milling cutter of a first diameter mounted on said pantograph, said stylus being circular and of a second diameter related to said first diameter, said pantograph being set for a given ratio between the movement of the stylus and the movement of the milling cutter, and means to rotate said milling cutter as the pattern means is traced by the circular periphery of the stylus to cut by said milling cutter in the template blank a template corresponding to the pattern means.

Other objects and a fuller understanding of the invention may be had by referring to the following description and claims, taken in conjunction with the accompanying drawings, in which:

Figure 3:
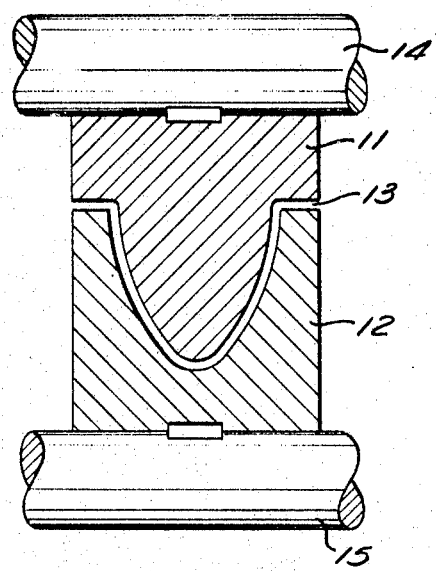
FIGURE 3 is a cross sectional view of forming rolls which may be made by the templates formed by the present invention.

FIGURE 3 illustrates in cross section a forming roll 11 and a forming roll 12 having a pass 13 therebetween of a given uniform dimension. This given uniform dimension might be .050" for example so that the two forming rolls, mounted on shafts 14 and 15, respectively, may be mounted in a roll stand and roll form strip or sheet metal of such thickness. Because of the specialized nature of the roll forming operation, each pair of rolls 11, 12 is especially designed to do the particular forming operation. These two rolls 11 and 12 are not exactly complementary as will be observed. If the two shafts 14 and 15 were brought together, the rolls would touch at the bottom of the groove and at the two opposite sides of the top but would be spaced apart along the generally sloping sides of the groove in roll 12. Thus these rolls 11 and 12 are only generally complementary and are strictly complementary only with respect to a given uniform dimension therebetween. In the past it has been customary to make such rolls 11 and 12 by a skilled machinist on an engine lathe or tool room lathe using as a guide a drawing 18.

Figure 2:
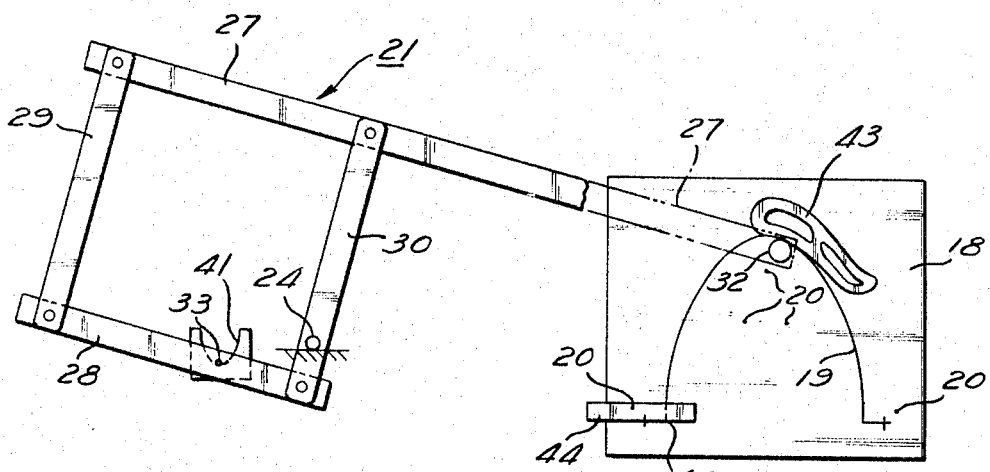
FIGURE 2 is a simplified plan view of the pantograph apparatus illustrating its use.

FIGURE 2 eshows the improved apparatus and method of the present invention utilizing this drawing 18. The drawing 18 will be made to an enlarged scale for increased accuracy, for example 3:1 or 5:1. On this drawing will be placed a line drawing 19 of the particular contour or shape desired on the finished template. This line drawing may be a thin pencil line and it has been found that such pencil line drawing may be constructed by usual drafting methods to an accuracy of .005″. The draftsman would lay out the line drawing 19 using various centers 20 from which different length radii of arcs would be drawn to construct the various arcs forming part of the line drawing 19.

Figure 1:
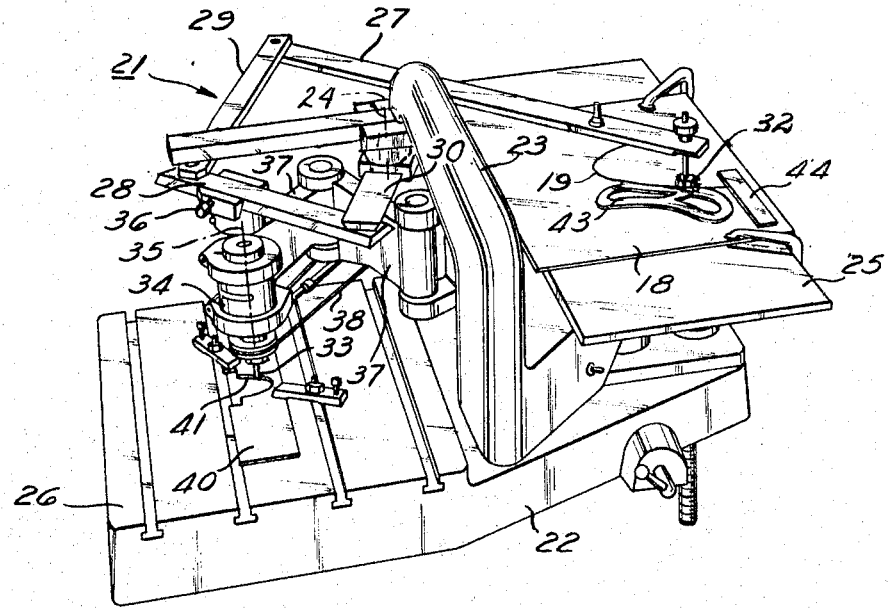
FIGURE 1 is a perspective view of a pantograph which may be used in the practice of the invention.

FIGURES 1 and 2 show a pantograph device 21 which is a typical pantograph usable with the invention. Pantograph 21 has a base 22, a column 23, and a fixed pivot 24 illustrated on FIGURE 1 by the vertical axis line 24. A pattern table 25 is carried on the base 22 and also a work table 26 is carried on the base 22. The fixed pivot 24 is usually an adjustably fixed pivot in order to vary the reduction ratio of the pantograph 21. The pantograph 21 also includes parallel arms 27 and 28 and two additional parallel arms 29 and 30 which together form a parallelogram. The adjustably fixed pivot 24 may be released and arm 30 may be slid along and clamped at any desired position. A stylus 32 is carried on the outer end of the arm 27. A milling cutter 33 is carried in a rotating cutter head 34 on a vertical axis 35. The milling cutter head 34 may be clamped by an adjustable clamp 36 at any place along the arm 28. The milling cutter head 34 is physically supported by articulated arms 37 from the column 23. The cutter head 34 may be rotated by a belt drive 38 from a motor beneath the pattern table 25. The workpiece blank 40 from which the finished template may be made may be clamped to the work table 26.

The preferred pantograph 21 is one which has precision bearings and is accurate to within .001″ in reproduction movement from the stylus 32 to the milling cutter 33. With the drawing 18 at an enlarged scale of 5:1, for example, the desired finished template 41 will then be reduced to one-fifth the size of the line drawing 19. The finished template 41 may be a thin gauge metal such as sheet steel or aluminum or may be some hardened plastic material such as Plexiglas, for example. The milling cutter may be of small diameter, for example ⅛″. In such case with the drawing enlarged 5:1 the stylus 32 is selected to be five times the cutting diameter of the milling cutter 33, or ⅝″ in this example. The FIGURE 2 shows the stylus diameter 32 and milling cutter 33 enlarged out of proportion to the scale of FIGURE 2 in order to show the relative diameter between stylus 32 and milling cutter 33. This ratio of 5:1 between the diameter of the stylus and the diameter of the milling cutter is essential for accuracy of the finished template. The center of the stylus 32 does not trace the line, instead it is the periphery of the circular stylus which traces the line. Also it is the periphery of the milling cutter, not the center thereof, which does the cutting of the template and accordingly it is essential that this 5:1 ratio, or the specified reduction ratio, between diameter of the stylus 32 and diameter of the milling cutter 33 be maintained.

Drawing 18 is fastened on the pattern table 25. Next guides 43 and 44 may be used with the line drawing 19 to guide the movement of the stylus 32. Guide 43 may be an ordinary draftsman's french curve, for example, and guide 44 may be a straight edge guide such as a ruler. The operator of the pantograph would normally start at one end such as the left end at which the straight edge guide 44 is shown. By placing the straight edge guide 44 directly on the pencil line drawing 19, the circular periphery of the stylus 32 will then guide the movement of the milling cutter 33 to cut the finished template 41. At the corner 46 the operator would change to a curved guide such as the french curve 43 or any one of several different french curves to guide the stylus 32 directly along the line drawing 19. The operator would only move the stylus along such curved guide 43 as long as it is visually clear that such curved guide lay directly on the line drawing 19. This might be one-half or one or two inches to make this template. Then the operator would stop moving the stylus and reposition the french curve guide for the next increment of movement. In this way the complete template 41 may be formed or cut in five to ten minutes. Then using this finished template 41 in a normal pattern and tracer controlled lathe, the finished steel form roll such as roll 12 may be completed in a very short time, for example one-half hour. This compares with the two to four hours previously required. Also with the 5:1 reduction from the template 41 the template 41 will have an accuracy to within .001″ and thus the accuracy is better than the usual method of fabricating by a skilled machinist.

Figure 4:
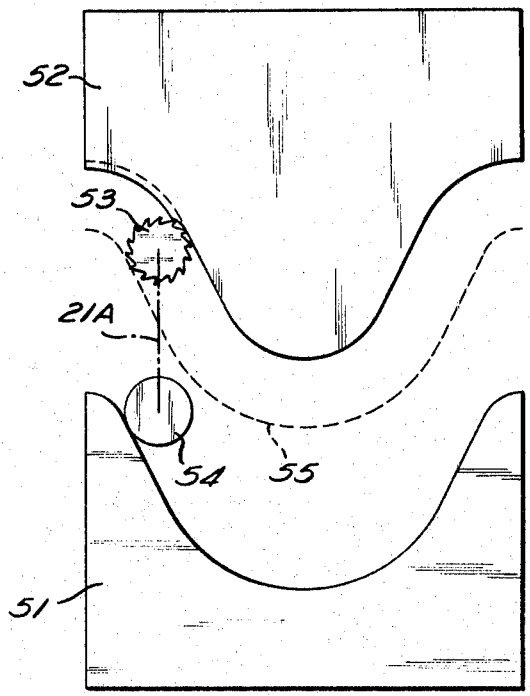
FIGURE 4 is a diagrammatic plan view of the forming of a second template.

FIGURE 4 illustrates a finished template 51 which has previously been made by the above described method. A second template 52 is desired which will be generally complementary to the first template 51, that is complementary with a given uniform dimension therebetween. This given uniform dimension will be the same as the thickness or gauge of the sheet metal with which the form rolls will be used, the pair of form rolls being later cut in accordance with the shape of the two templates 51 and 52. Such form rolls will be the pairs similar to the pair of rolls 11, 12. In FIGURE 4 the pantograph device is illustrated between linkage 21A between a milling cutter 53 and a stylus 54. In this case the pantograph 21A will be set to have a unity ratio of 1:1 and thus will be a duplicator device as a special case of a pantograph. With this unity ratio, the first template 51 will be clamped on the pattern table 25 and the template blank from which template 52 will be cut will be clamped on the work table 26. The milling cutter 53 will be chosen to have a diameter equal to the gauge thickness of the metal to be form rolled by the rolls to be made from the templates 51 and 52. Accordingly the stylus 54 will also be chosen to have the same diameter. Now with the cylindrical periphery of stylus 54 following template 51 as a pattern, the milling cutter 53 will mill or form the second finished template 52. A path 55 is shown by dotted lines in FIGURE 4 and this path is shown for illustration purposes only. It is the contour of the first template 51 moved upwardly to lie tangent to the cutting edge of the milling cutter 53 and thus illustrate that the finished contour on the second template 52 plus the given uniform dimension is complementary to the first template 51.

Figure 5:
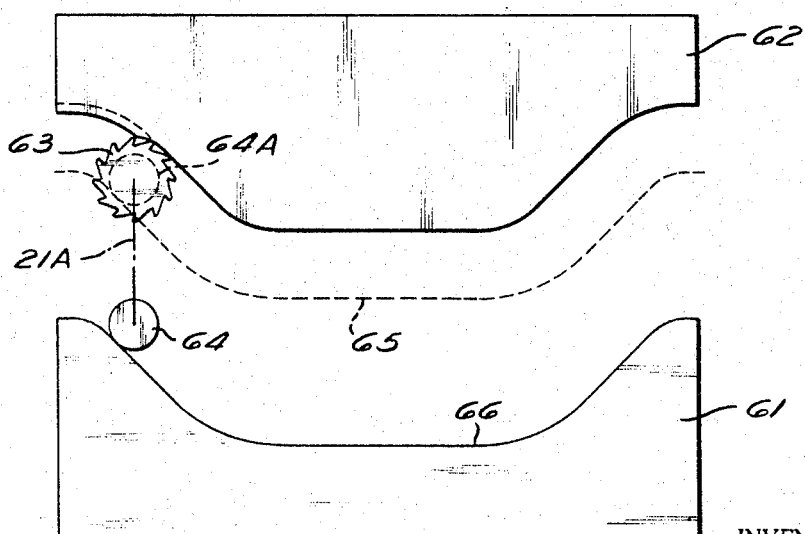
FIGURE 5 is an other diagrammatic plan view of the forming of a second template.

FIGURE 5 illustrates another feature of the invention. In many cases thin gauge metals are to be roll formed by the pair of rolls such as rolls 11, 12. Such gauge might be .050″ for example. In such case it may be difficult to obtain a small diameter milling cutter such as milling cutter 53 which has only .050″ diameter. Also if the gauge thickness of the metal is some dimension such as .048″, it may be difficult to get a milling cutter exactly this diameter. Accordingly FIGURE 5 shows a modification to accommodate the fact that the gauge may be thin or the milling cutter diameter may not be obtainable equal to such gauge thickness. Again the pantograph 21A is set at a 1:1 ratio. Let it be assumed that the gauge thickness is .050″. Also let it be assumed that the diameter of the milling cutter 63 is .062″ or about 1/16 inch. This diameter is .012″ too large and hence this is a first amount by which the diameter of the milling cutter exceeds the given uniform dimension to be achieved between the pair of rolls and between the pair of generally complementary templates. Accordingly the FIGURE 5 shows a stylus 64 of a diameter less than said given uniform dimension by said first amount. In this example it would be .050″ minus .012″ or .038″ in diameter for stylus 64. FIGURE 5 shows the first template 61 and the second template 62 to be formed. The contour 66 of template 61 is the same as path 65 shown by dotted lines. A dotted circle 64A of the same diameter as stylus 64 is shown coaxial with cutter 63 and tangent to path 65. This illustrates that the imaginary stylus 64A is tracing the path 65. Therefore the radius of the milling cutter plus the radius of the stylus 64 is equal to the given uniform dimension. In the above example the radius of the milling cutter 63 would be .031″ plus .019″ as the radius of the stylus 64 and the total is .050″ to equal the given uniform dimension. This FIGURE 5 shows that one of the diameters of the milling cutter 63 and stylus 64 is larger than said given uniform dimension by a first amount, and the other of said diameters is smaller than said given uniform dimension by said first amount. This establishes the proper relationship between the milling cutter 63 and stylus 64 so the cutter will cut the proper contour on the second template 62.

A simple formula for determining the relationship in diameter of the stylus and cutter for particular thickness of metal is the following: $S=2M-C$ wherein S is the stylus diameter, M is the metal thickness and C is the cutter diameter. Using the above example of metal thickness of .050″ and a milling cutter selected to be .062″ in diameter and substituting in the formula one obtains:

$$S = 2 \times .050 - .062 = .038''$$

From this formula one can easily determine the stylus diameter or if a particular stylus diameter is selected one can determine the proper cutting diameter both in relation to the metal thickness.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and method steps may be resorted to without departing from the spirit and the scope of the invention as hereinafter claimed.

What is claimed is:
1. The method of using a stylus and tracer and a first template to control a milling cutter to cut from a blank a second template complementary to the first with a given uniform dimension therebetween, comprising the steps of:
selecting a milling cutter of a first diameter related to said given uniform dimension,
said first diameter being less than twice given uniform dimension,
selecting a circular stylus of a second diameter equal to said first diameter,
mounting said stylus on a tracer arm to follow said first template, and
using said tracer arm to control the movement in a ratio of 1:1 of the milling cutter to have said milling cutter cut a second template from a template blank.
2. A template cutting apparatus to cut from a template blank a template corresponding to pattern means comprising, in combination:
a pantograph having a stylus,
a rotatable milling cutter of a first diameter mounted on said pantograph,
said stylus being circular and of a second diameter related to said first diameter,
said pantograph being set for a given ratio between the movement of the stylus and the movement of the milling cutter, which ratio is proportional to the ratio of said second to said first diameter,
means to rotate said milling cutter as the pattern means is traced by the circular periphery of the stylus to cut by said milling cutter in the template blank a template corresponding to the pattern means,
said pattern means being complementary to said template with a given uniform dimension therebetween,
one of said first and second diameters being larger than said given dimension by a first amount,
and the other of said first and second diameters being smaller than said given dimension by said first amount.
3. A template cutting apparatus to cut from a template blank a template corresponding to pattern means comprising, in combination:
a pantograph having a stylus,
a rotatable milling cutter of a first diameter mounted on said pantograph,
said stylus being circular and of a second diameter related to said first diameter,
said pantograph being set for a given ratio between the movement of the stylus and the movement of the milling cutter, which ratio is proportional to the ratio of said second to said first diameter,
means to rotate said milling cutter as the pattern means is traced by the circular periphery of the stylus to cut by said milling cutter in the template blank a template corresponding to the pattern means,
said first diameter being larger than said given dimension by a first amount, and
said second diameter being smaller than said given dimension by said first amount.
4. The method of using a pantograph and pattern means to control a milling cutter to cut from a template blank a finished template corresponding to the pattern means, comprising, the steps of:
selecting a milling cutter of a first diameter,
mounting said milling cutter on said pantograph,
selecting a circular stylus of said first diameter,
mounting said stylus on said pantograph,
setting said pantograph for a 1:1 ratio of movement of the stylus relative to the movement of the milling cutter,
rotating said milling cutter,
tracing the pattern means by the circular periphery of the stylus to cause the milling cutter to cut in the template blank a finished template corresponding to the pattern means, and
said pattern means being a first template and said finished template being complementary to said first template with a given uniform dimension therebetween.
5. The method of using a pantograph and pattern means to control a milling cutter to cut from a template blank a finished template corresponding to the pattern means, comprising, the steps of:
selecting a milling cutter of a first diameter,
mounting said milling cutter on said pantograph,
selecting a circular stylus of a second diameter related to said first diameter,
mounting said stylus on said pantograph,
setting said pantograph for a 1:1 ratio of movement of the stylus relative to the movement of the milling cutter,
rotating said milling cutter, tracing the pattern means by the circular periphery of the stylus to cause the milling cutter to cut in the template blank a finished template corresponding to the pattern means, said pattern means being a first template and said finished template being complementary to said first template with a given uniform dimension therebetween, said selected first diameter of the milling cutter being larger than said given uniform dimension by a first amount, and said selected second diameter of said stylus being smaller than said given uniform dimension by said first amount.

References Cited

UNITED STATES PATENTS

| | | | |
|---|---|---|---|
| 1,423,154 | 7/1922 | Rosak | 90—13 |
| 2,583,653 | 1/1952 | Keczel | 90—13.1 |
| 2,669,161 | 2/1954 | Frampton | 90—58 |
| 1,617,312 | 2/1927 | Braren | 90—13.1 |
| 2,199,261 | 4/1940 | Kapp et al. | 90—13.1 |
| 2,600,402 | 6/1952 | Griffin | 90—13.1 |

GERALD A. DOST, *Primary Examiner.*

U.S. Cl. X.R.

33—23, 25, 27; 90—62